United States Patent
Cohen et al.

(10) Patent No.: US 8,996,768 B2
(45) Date of Patent: *Mar. 31, 2015

(54) METHOD AND STORAGE DEVICE FOR ASSESSING EXECUTION OF TRIM COMMANDS

(75) Inventors: Oren Cohen, Tel Aviv (IL); Eyal Sobol, Givat Shmuel (IL); Omer Gilad, Gan Yavne (IL); Judah G. Hahn, Ofra (IL)

(73) Assignee: SanDisk Technologies Inc., Plano, TX (US)

( * ) Notice: Subject to any disclaimer, the term of this patent is extended or adjusted under 35 U.S.C. 154(b) by 333 days.

This patent is subject to a terminal disclaimer.

(21) Appl. No.: 13/524,913

(22) Filed: Jun. 15, 2012

(65) Prior Publication Data

US 2013/0326096 A1    Dec. 5, 2013

Related U.S. Application Data

(60) Provisional application No. 61/654,006, filed on May 31, 2012.

(51) Int. Cl.
| | | |
|---|---|---|
| *G06F 13/14* | (2006.01) | |
| *G06F 12/02* | (2006.01) | |
| *G06F 3/06* | (2006.01) | |
| *G06F 11/34* | (2006.01) | |

(52) U.S. Cl.
CPC ............... *G06F 3/061* (2013.01); *G06F 3/0653* (2013.01); *G06F 3/0659* (2013.01); *G06F 3/0679* (2013.01); *G06F 12/0246* (2013.01); *G06F 11/3485* (2013.01); *G06F 11/3419* (2013.01)
USPC ................ 710/74; 710/5; 711/154

(58) Field of Classification Search
CPC combination set(s) only.
See application file for complete search history.

(56) References Cited

U.S. PATENT DOCUMENTS

| | | | |
|---|---|---|---|
| 2002/0120815 A1 | 8/2002 | Zahavi et al. | |
| 2010/0217927 A1 | 8/2010 | Song et al. | |
| 2010/0262795 A1 | 10/2010 | Hetzler et al. | |
| 2011/0145474 A1 | 6/2011 | Intrater | |
| 2011/0208898 A1 | 8/2011 | Shin | |
| 2012/0059978 A1 | 3/2012 | Rosenband et al. | |
| 2012/0110247 A1 | 5/2012 | Eleftheriou et al. | |
| 2012/0110249 A1 | 5/2012 | Jeong et al. | |
| 2012/0117309 A1 | 5/2012 | Schuette | |
| 2012/0131263 A1 | 5/2012 | Yeh | |
| 2012/0243329 A1* | 9/2012 | Nagashima | 365/185.22 |
| 2013/0135767 A1* | 5/2013 | Hall et al. | 360/66 |
| 2013/0219106 A1* | 8/2013 | Vogan et al. | 711/103 |

OTHER PUBLICATIONS

Windows Performance Analysis Developer Center, http://msdn.microsoft.com/en-us/performance/cc709422.aspx, 3 pages, printed May 31, 2012.

(Continued)

*Primary Examiner* — Ilwoo Park
(74) *Attorney, Agent, or Firm* — Brinks Gilson & Lione

(57) ABSTRACT

A method and storage device for assessing execution of trim commands are provided. In one embodiment, a trace of trim and write commands sent to a storage device are obtained. For each trim command in the trace, a subsequent write command to a same logical block address (LBA) as the trim command is identified, and an elapsed time between the trim and write commands is calculated. This information can be used to display a histogram and/or to optimize when the storage device executes trim commands and/or when the host device issues trim commands.

45 Claims, 5 Drawing Sheets

(56) References Cited

OTHER PUBLICATIONS

International Search Report and Written Opinion for PCT/US2013/036903 dated Sep. 17, 2013, 12 pages.
"Sierra M6-4 SAS/SATA Protocol Analyzer-User Manual", *Lecroy*, retrieved from internet: http://cdn.teledynelecroy.com/files/manuals/sierram6-4usermanual.pdf, May 2011, pp. FP-466.
Application as filed for U.S. Appl. No. 13/524,924 entitled, "Method and Host Device for Assessing Execution of Trim Commands", filed on Jun. 15, 2012, 20 pages.
Office Action for U.S. Appl. No. 13/524,924 dated Jan. 29, 2014, 23 pages.
Giryoung et al., "Performance Analysis of SSD Write Using TRIM in NFTS and EXT4", Nov. 29, 2011-Dec. 1, 2011, *Computer Sciences and Convergence Information Technology (ICCIT)*, 2011 6$^{th}$ International Conference, pp. 422-423.
Koltsidas et al., "Data Management Over Flash Memory", Jun. 12-16, 2011, SIGMOD '11, Athens, Greece, pp. 1209-1212.
Office Action for U.S. Appl. No. 13/524,924 dated Aug. 7, 2014, 25 pages.

\* cited by examiner

METHOD AND STORAGE DEVICE FOR ASSESSING EXECUTION OF TRIM COMMANDS

CROSS-REFERENCE TO RELATED APPLICATION

This application claims the benefit of U.S. Provisional Patent Application No. 61/654,006, which was filed on May 31, 2012 and is hereby incorporated by reference herein.

BACKGROUND

Non-volatile memory storage devices based on NAND technology employ an erase/program cycle, which may impact performance if free blocks are not available at the time of write. Modern NAND-based storage devices erase blocks of storage proactively when they are not in use to improve performance. At present, some host devices can send "trim" commands to NAND storage devices in order to indicate to the storage device that a certain logical block address (LBA) range is no longer in use by the host's file system. However, using trim commands effectively requires tuning and analysis to insure that enough free blocks are available and that the trim commands themselves do not reduce performance/endurance. Microsoft's Performance Toolkit includes the ability to log input/output commands at the driver level, but it lacks the analysis capability required to properly assess the effectiveness of trim commands in order to optimize performance.

OVERVIEW

Embodiments of the present invention are defined by the claims, and nothing in this section should be taken as a limitation on those claims.

By way of introduction, the below embodiments relate to a method and storage device for assessing execution of trim commands. In one embodiment, a trace of trim and write commands sent to a storage device are obtained. For each trim command in the trace, a subsequent write command to a same logical block address (LBA) as the trim command is identified, and an elapsed time between the trim and write commands is calculated. This information can be used to display a histogram of the data and/or to optimize when the storage device executes trim commands and/or when the host device issues trim commands. Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Exemplary Host and Storage Devices

Figure 1:
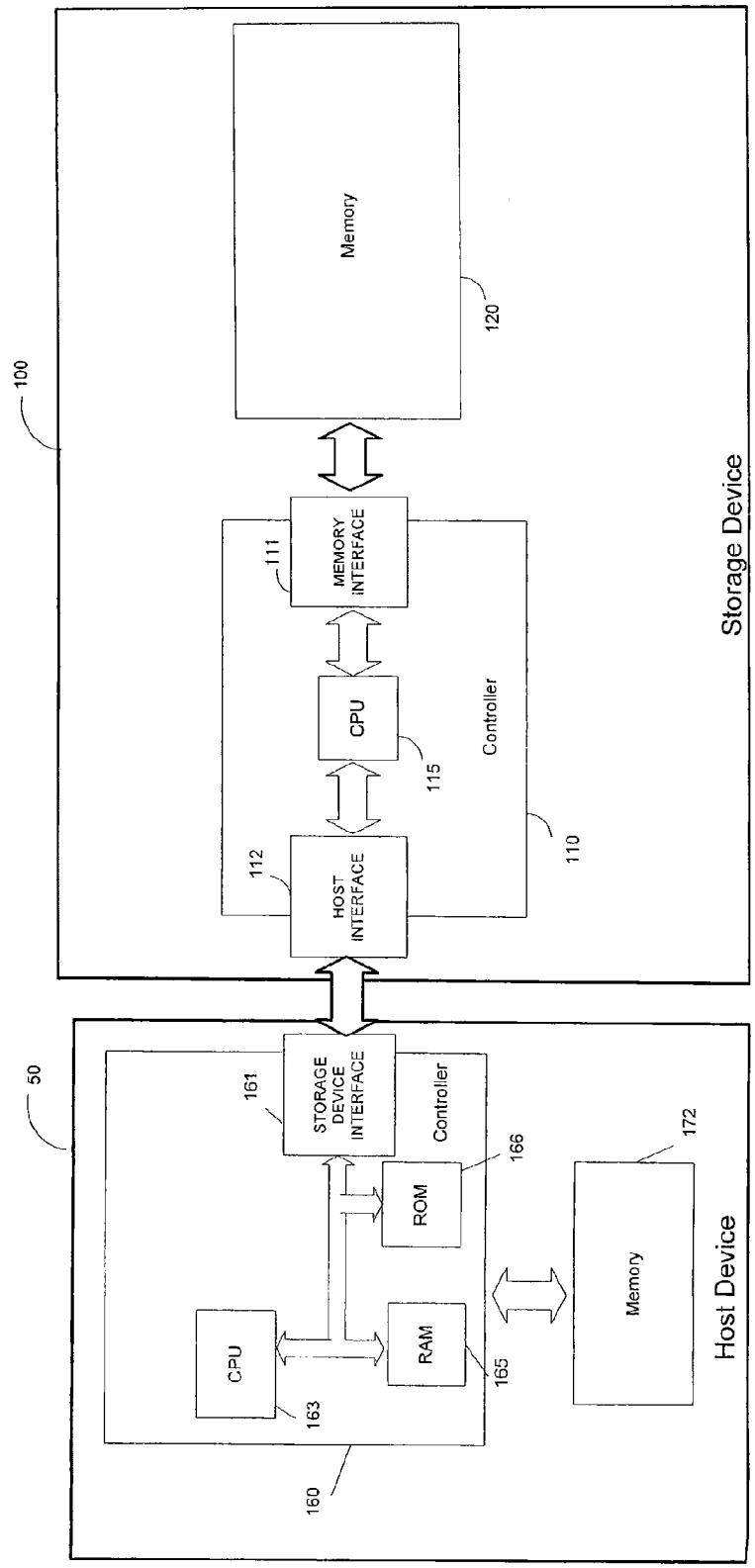
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors (interfaces) that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof.

In this embodiment, the storage device 100 is a mass storage device and takes the form of a solid-state drive (SSD), as that type of storage device currently supports the trim command. Other storage devices that can be used if they support the trim command include, but are not limited to, a handheld, removable memory card (such as a Secure Digital (SD) card or a MultiMedia Card (MMC)), a universal serial bus (USB) device, and embedded memory (e.g., a secure module embedded in the host device 50), such as an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 115. The controller 110 can be implemented in any suitable manner. For example, the controller 110 can take the form of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller, for example. Suitable controllers can be obtained from Marvell or SandForce. The memory 120 can take any suitable form. In one embodiment, the memory 120 takes the form of a solid-state (e.g., flash) memory. However, other forms of memory suitable for use with a trim command, such as optical memory using packet-based writing can be used. It should be noted that the storage device 100 shown in FIG. 1 is but one of many possible implementations.

Turning now to the host device 50, the host device 50 comprises a controller 160 that has a storage device interface 161 for interfacing with the storage device 100 The controller 160 also comprises a central processing unit (CPU) 163, read access memory (RAM) 165, and read only memory (ROM) 166. The storage device 100 also contains a memory 172 for storing, for example, applications (apps) and programs (e.g., a browser, a media player, etc.) used in the operation of the host device 50. The controller's RAM 165 and/or the memory 172 can be used as a buffer for storing commands to be sent to the storage device 100. The host device 50 can contain other components (e.g., a display device, a speaker, a headphone jack, a video output connection, etc.), which are not shown in FIG. 1 to simplify the drawings. Also, other implementations of the host device 50 are possible.

In some environments, the host device 50 is operable to render content stored in the storage device 100. As used herein, "content" can take any suitable form, including, but not limited to, a song, a movie, a game, an application ("app"), a game installer, etc. Depending on the type of content, "render" can mean playing (e.g., when the content is a song or movie), deciphering (e.g., when the content is a game installer), or whatever action is needed to "enjoy" the content. In some embodiments, the host device 50 contains the necessary software to render the content (e.g., a media player), whereas, in other embodiments, such software is provided to the host device 50 by the memory device 100 or another entity.

Embodiments Related to Assessing Execution of Trim Commands

The host device 50 can issue a "trim" command to inform the storage device 100 if a logical block address (LBA) is no longer in use (e.g., when a user deletes a file, when a file is moved or defragmented, etc.). In response to the trim command, the storage device 100 may erase the page that contains the LBA, which provides additional free space to hold data for subsequent writes. The trim command from the host device 50 is often followed by a write command to write data to the erased LBA. If the storage device 100 executes the trim command when received from the host device 50, the storage device 100 may incur an unnecessary performance penalty, as the erase process takes time and may not be immediately needed if there are free blocks available to execute the write command. Instead, the storage device 100 can execute the write command by storing data in the free blocks and, later during idle time, perform the erase operation. However, typical storage devices execute trim commands upon receipt.

The following embodiments provide techniques that can be used to analyze the elapsed time between when a host device sends a trim command and when it sends a subsequent write command to the same LBA. This time delta can be used to assess trim command efficiency and determine whether the storage device 100 can delay or avoid execution of a trim command and still achieve the same or similar performance level as if the trim command were executed upon receipt. This information can also be used to delay when a trim command is sent by the host device 50 to the storage device 100. The information can be visually displayed to a user (e.g., via a histogram) and/or can be used to manually, automatically, or semi-automatically tune the algorithm for executing or sending trim commands. In addition, the analysis can show whether the trim command, if executed immediately, would improve performance by freeing blocks that would otherwise have to be erased during the execution of a write command.

Figure 2:
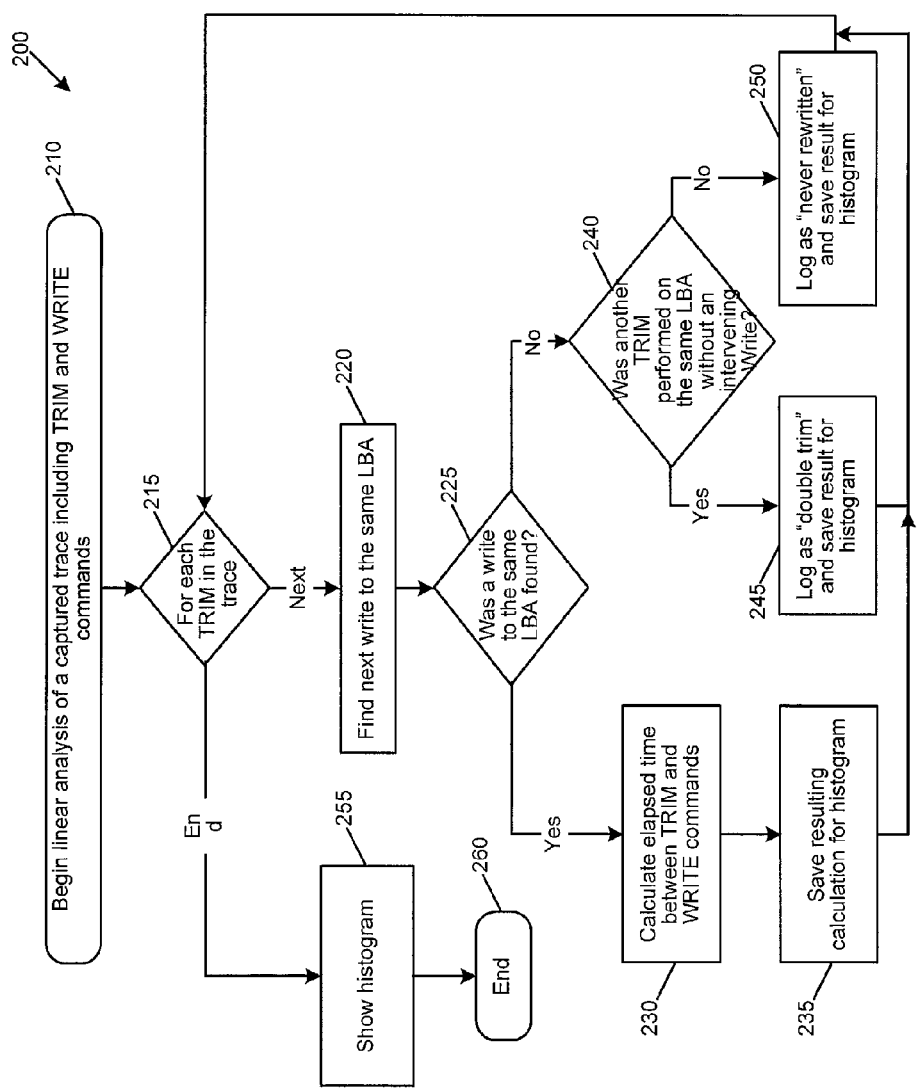
FIG. 2 is a flow chart of a trim command analysis process of an embodiment.

Returning to the drawings, FIG. 2 is a flow chart 200 of a trim command analysis process of an embodiment. As shown in FIG. 2, the process starts by beginning a linear analysis of a capture trace of commands from the host device 50 to the storage device 100 that include trim and write commands (act 210). It should be noted that this process can be performed by the host device 50, by the storage device 100, or by a device (e.g., a bus analyzer) between the host device 50 and the storage device 100. For example, if performed by the host device 50, the trace can be a log of the commands sent to the storage device 100. If performed by the storage device 100, the trace can be a log of commands received from the host device 50 by the storage device 100. If performed by a bus analyzer or other intermediary device, the trace can be the commands captured in the transmission from the host device 50 to the storage device 100. Also, this process can be done in real time as the commands are being sent to the storage device 100 or in an off-line manner.

Next, it is determined whether there is a trim command in the trace (act 215), and, if there is, an attempt is made to identify the first write command to the same LBA (acts 220 and 225). This may involve skipping read and other commands that may be present between the trim and write commands. If a write to the same LBA is found, the elapsed time between the trim and write commands is calculated (act 230), and the resulting calculation is saved (act 235) (here, for the generation of a histogram; however, as noted above, the calculation can be used to tune the trim execution or transmission algorithms).

If a write to the same LBA is not found, it is determined whether another trim command was performed on the same LBA without an intervening write command (act 240). If another trim command was performed (either by error or due to the programming of the host device 50), the process logs this event as a "double trim" event (act 245). If, on the other hand, another trim command was not performed, the process logs this event as a "never rewritten" event (act 250). This can occur, for example, if the host device 50 did not properly record the first trim command as having occurred.

Figure 3:
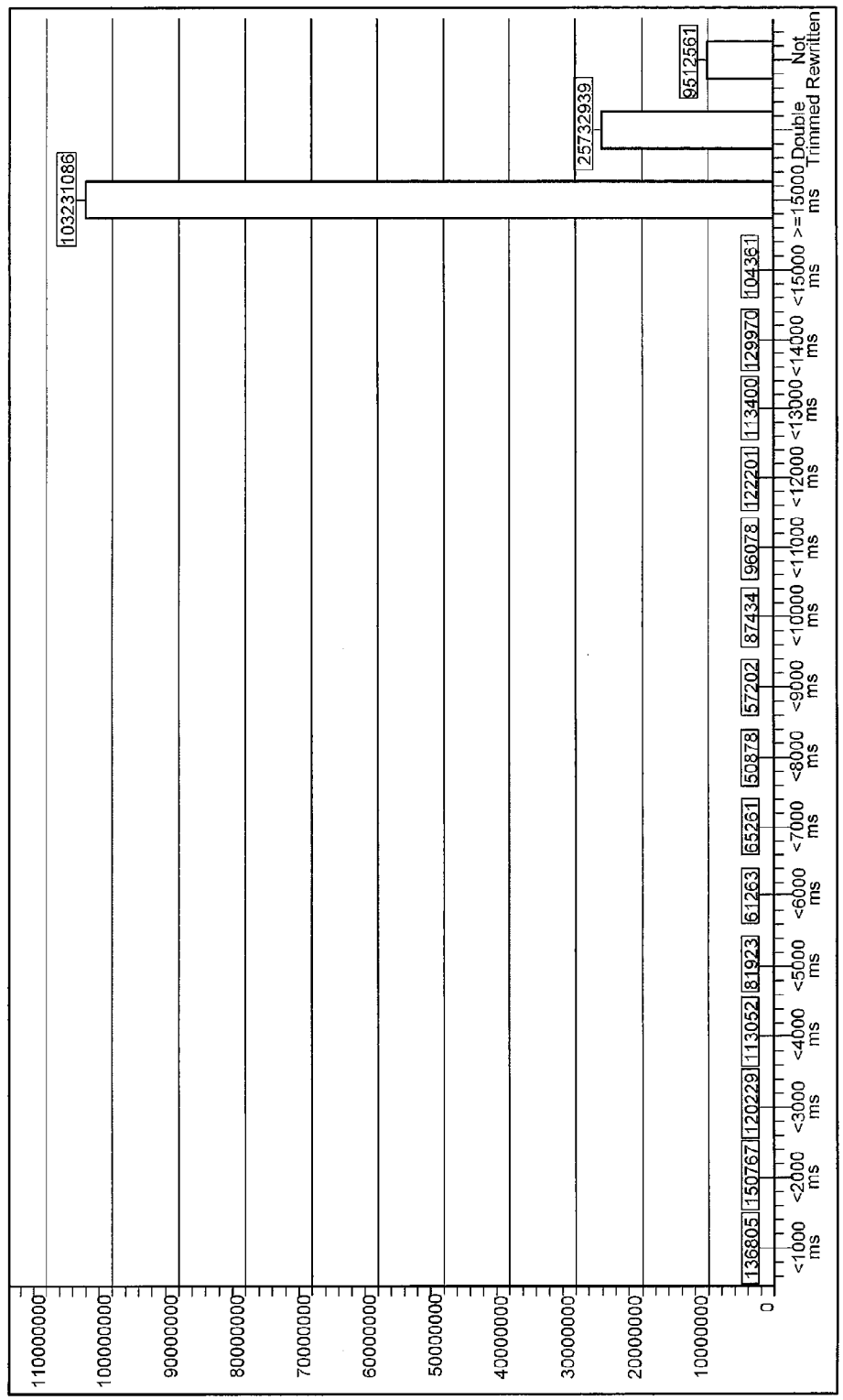
FIG. 3 is a histogram resulting from a trim command analysis process of an embodiment.

The above process is repeated for the remaining trims in the trace. At the conclusion, a histogram from the calculations is displayed (act 255), and the process ends (act 260). An example of the resulting histogram is shown in FIG. 3. This histogram shows number of writes on the y-axis and the time between trim and write commands on the x-axis over a 30-day period. As shown in FIG. 3, for the vast majority of writes, there were 15 or more seconds between trim and write commands to the same LBA. (There is also a significant number of "double trim" events and "never rewritten" events.) This means that the storage device 100 does not need to execute trim commands immediately, as, on average, it takes at least 15 seconds before the host device 50 sends a write command to the same LBA. If it turns out that a write command is received in less than 15 second from the receipt of the trim command, the storage device 100 can still execute the write command without erasing if there are sufficient free blocks in the memory. Otherwise, the storage device 100 can perform the erase operation when it receives the write command sooner.

With this histogram, a user or technician can tune the firmware of the storage device 100, so the storage device 100 will delay at least 15 second before performing a trim command. Also, the information from the histogram on the number of writes issued sooner than 15 seconds as a proportion of the total number of writes in the trace can be used to inform the storage device 100 of the average number of free blocks it should have available. As noted above, the analysis can be performed by any suitable device, and the histogram can be displayed on the host device 50 or some other device. Also, instead of or in addition to displaying a histogram, the information gathered by this process can be used to tune the storage device 100 and/or the host device 50 to adjust the delay in executing or transmitting, respectively, a trim command.

There are many alternatives that can be used with these embodiments. For example, an operating system free disk space query may be used to further enhance the analysis by calculating theoretical free space available to the storage device 100. That is, if the process knows how much free space there is, it can factor in how important it is to perform a trim command to obtain more free space (e.g., by adjusting the frequency of performing trim commands based on available free space). This is shown in the flow chart 400 of FIG. 4. Acts 410-460 in this flow chart 400 are virtually identical to acts 210-260 in the flow chart 200 of FIG. 2 except for the added step of checking free space at the time of the trim command (act 422). This can be performed, for example, by sending a Get Disk Free Space command in a Windows-based host device or a STAT command in a Linux-based host device. In response to such a command, the host device 50 will provide what its operating system believes to be the free space available on the storage device. Such commands can be issued periodically or once at the beginning of the analysis and thereafter adjusting the count based on the number of trims and writes. The free space information can be used along with the calculated elapsed time between trim and write commands to generate the histogram (act 435) or perform any other of the optimizations noted above.

Figure 4:
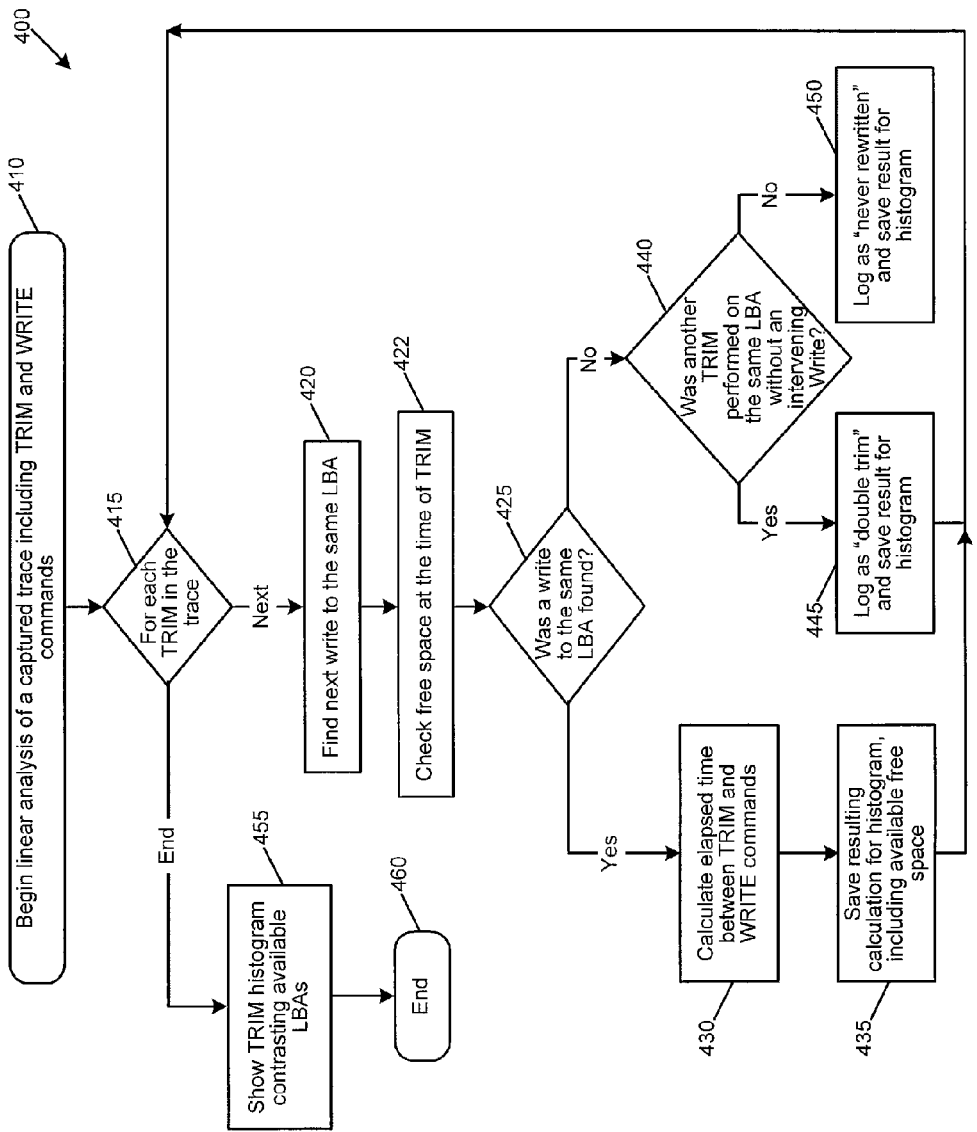
FIG. 4 is a flow chart of a trim command analysis process using free-space analysis of an embodiment.
Figure 5:
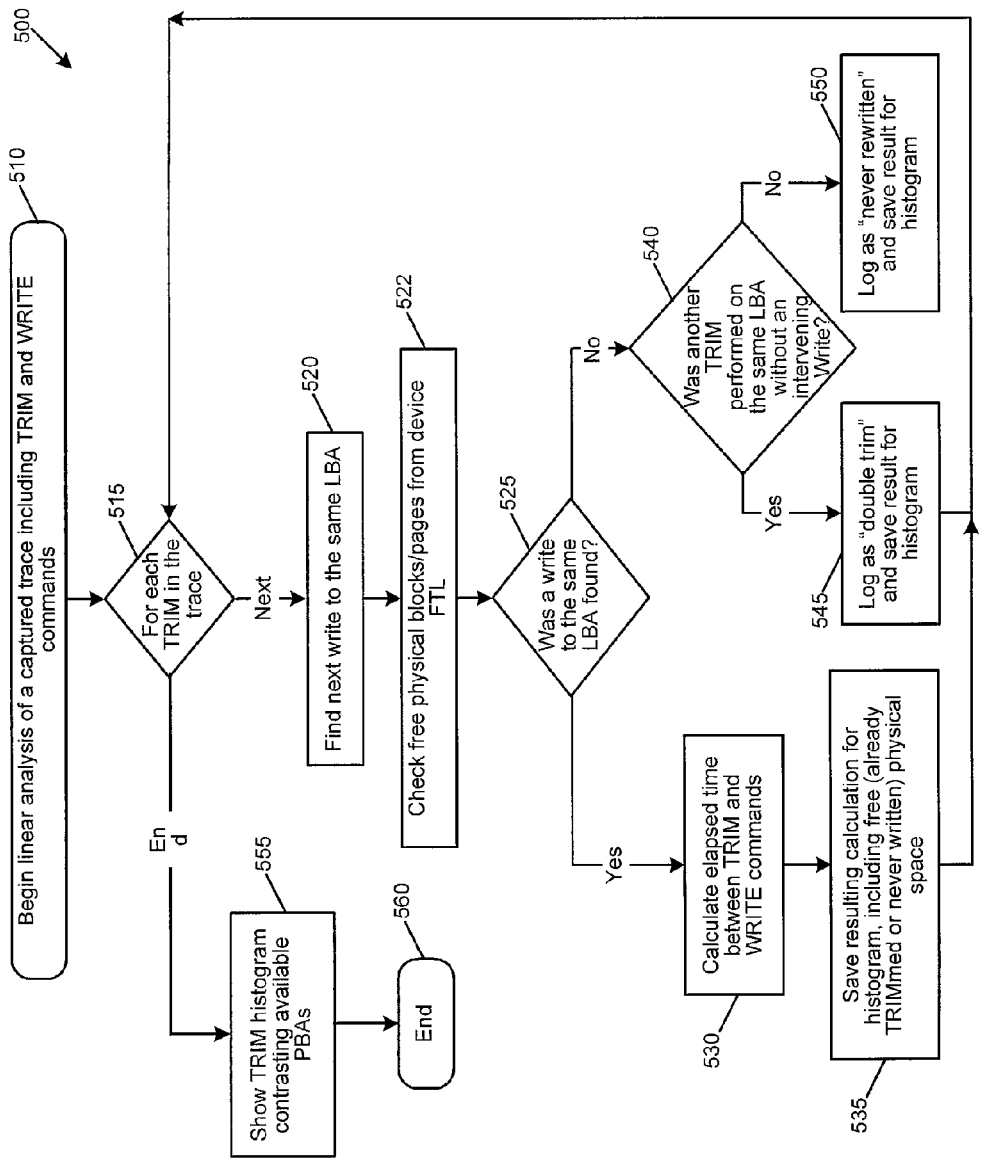
FIG. 5 is a flow chart of a trim command analysis process using physical free-block-count analysis of an embodiment.

While the process shown in FIG. 4 provides a more accurate analysis than the process shown in FIG. 2, the free space used in that analysis may not be accurate, as the information is coming from the host device's operating system and not the storage device 100 and assumes that trim commands sent by the host device 50 are, in fact, executed by the storage device 100. That is, anything marked as trimmed by the host's operating system, even thought not yet trimmed by the storage device 100, will be marked as free space. To address this, in another embodiment, the process takes into account the actual free space on the storage device 100. This embodiment will be illustrated in conjunction with the flow chart 500 in FIG. 5. Acts 510-560 in this flow chart 500 are virtually identical to acts 410-460 in the flow chart 400 of FIG. 4 except the physical blocks/pages from the storage device's flash translation layer (FTL) are checked instead of checking free space designated by the host device 50 (act 522). (The FTL maps the host LBAs to physical blocks in the memory.) This operation can be performed with a proprietary command to the storage device 100. As with the above processes, the result of this process can be used for the generation of a histogram and/or for firmware, software, and infrastructure optimizations in order to improve performance of trim operations.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage device comprising:
a host device interface through which the storage device can communicate with a host device; and
a controller in communication with host device interface, wherein the controller is configured to:
obtain a trace of trim and write commands sent to the storage device; and
for each trim command in the trace:
identify a subsequent write command to a same logical block address (LBA) as the trim command; and
calculate an elapsed time between the trim and write commands.

2. The storage device of claim 1, wherein the controller is further configured to:
generate a histogram based on the calculated elapse time.

3. The storage device of claim 1, wherein the controller is further configured to:
adjust when the storage device executes trim commands based on the calculated elapse time.

4. The storage device of claim 1, wherein the controller is further configured to:
if a subsequent write command to the same LBA is not identified, determine whether another trim command was issued to the same LBA without an intervening write command.

5. The storage device of claim 4, wherein the controller is further configured to:
if another trim command was issued to the same LBA without an intervening write command, log a double trim occurrence.

6. The storage device of claim 4, wherein the controller is further configured to:
if another trim command was not issued to the same LBA without an intervening write command, log a never rewritten occurrence.

7. The storage device of claim 1, wherein the controller is further configured to:
determine available physical blocks in the storage device.

8. The storage device of claim 7, wherein the controller is further configured to:
adjust when the storage device executes trim commands based on the calculated elapse time and the available LBA space.

9. A method for assessing execution of trim commands, the method comprising:
performing the following in a storage device:
obtaining a trace of trim and write commands sent to the storage device; and
for each trim command in the trace:
identifying if there is a subsequent write command to a same logical block address (LBA) as the trim command; and
if there is a subsequent write command to the same LBA, calculating an elapsed time between the trim and write commands.

10. The method of claim 9 further comprising:
generating a histogram based on the calculated elapse time.

11. The method of claim 9 further comprising:
adjusting when the storage device executes trim commands based on the calculated elapse time.

12. The method of claim 9 further comprising:
if there is not a subsequent write command to the same LBA, determining whether another trim command was issued to the same LBA without an intervening write command.

13. The method of claim 12 further comprising:
if another trim command was issued to the same LBA without an intervening write command, logging a double trim occurrence.

14. The method of claim 12 further comprising:
if another trim command was not issued to the same LBA without an intervening write command, logging a never rewritten occurrence.

15. The method of claim 9 further comprising:
determining available physical blocks in the storage device.

16. The method of claim 15 further comprising:
adjusting when the storage device executes trim commands based on the calculated elapse time and the available LBA space.

17. A host device comprising:
a storage device interface through which the host device can communicate with a storage device; and
a controller in communication with storage device interface, wherein the controller is configured to:
obtain a trace of trim and write commands sent to the storage device; and
for each trim command in the trace:
identify a subsequent write command to a same logical block address (LBA) as the trim command; and
calculate an elapsed time between the trim and write commands.

18. The host device of claim 17, wherein the controller is further configured to:
generate a histogram based on the calculated elapse time.

19. The host device of claim 17, wherein the controller is further configured to:
adjust when the storage device executes trim commands based on the calculated elapse time.

20. The host device of claim 17, wherein the controller is further configured to:
adjust when the host device issues trim commands based on the calculated elapse time.

21. The host device of claim 17, wherein the controller is further configured to:
if a subsequent write command to the same LBA is not identified, determine whether another trim command was issued to the same LBA without an intervening write command.

22. The host device of claim 21, wherein the controller is further configured to:
if another trim command was issued to the same LBA without an intervening write command, log a double trim occurrence.

23. The host device of claim 21, wherein the controller is further configured to:
if another trim command was not issued to the same LBA without an intervening write command, log a never rewritten occurrence.

24. The host device of claim 17, wherein the controller is further configured to:
determine available LBA space from host device data.

25. The host device of claim 24, wherein the controller is further configured to:
adjust when the storage device executes trim commands based on the calculated elapse time and the available LBA space.

26. The host device of claim 24, wherein the controller is further configured to:
adjust when the host device issues trim commands based on the calculated elapse time and the available LBA space.

27. The host device of claim 17, wherein the controller is further configured to:
determine available physical blocks in the storage device.

28. The host device of claim 27, wherein the controller is further configured to:
adjust when the storage device executes trim commands based on the calculated elapse time and the available LBA space.

29. The host device of claim 27, wherein the controller is further configured to:
adjust when the host device issues trim commands based on the calculated elapse time and the available LBA space.

30. A method for assessing execution of trim commands, the method comprising:
performing the following in a device external to and in communication with a storage device:
obtaining a trace of trim and write commands sent to the storage device; and
for each trim command in the trace:
identifying if there is a subsequent write command to a same logical block address (LBA) as the trim command; and
if there is a subsequent write command to the same LBA, calculating an elapsed time between the trim and write commands.

31. The method of claim 30 further comprising:
generating a histogram based on the calculated elapse time.

32. The method of claim 30 further comprising:
adjusting when the storage device executes trim commands based on the calculated elapse time.

33. The method of claim 30 further comprising:
adjusting when the host device issues trim commands based on the calculated elapse time.

34. The method of claim 30 further comprising:
if there is not a subsequent write command to the same LBA, determining whether another trim command was issued to the same LBA without an intervening write command.

35. The method of claim 34 further comprising:
if another trim command was issued to the same LBA without an intervening write command, logging a double trim occurrence.

36. The method of claim 34 further comprising:
if another trim command was not issued to the same LBA without an intervening write command, logging a never rewritten occurrence.

37. The method of claim 30 further comprising:
determining available LBA space from host device data.

38. The method of claim 37 further comprising:
adjusting when the storage device executes trim commands based on the calculated elapse time and the available LBA space.

39. The method of claim 37 further comprising:
adjusting when the host device issues trim commands based on the calculated elapse time and the available LBA space.

40. The method of claim 30 further comprising:
determining available physical blocks in the storage device.

41. The method of claim 40 further comprising:
adjusting when the storage device executes trim commands based on the calculated elapse time and the available LBA space.

42. The method of claim 40 further comprising:
adjusting when the host device issues trim commands based on the calculated elapse time and the available LBA space.

43. The method of claim 42, wherein the method is performed by the host device.

44. The method of claim 42, wherein the method is performed by a device between the host and storage devices.

45. The method of claim 44, wherein the device between the host and storage devices is a bus analyzer.

* * * * *